United States Patent [19]

Metzger

[11] Patent Number: 5,681,517
[45] Date of Patent: Oct. 28, 1997

[54] METHOD OF PRODUCING CASEIN FILM

[75] Inventor: Wolfgang Metzger, Weimar, Germany

[73] Assignee: Doxa GmbH, Wiehe, Germany

[21] Appl. No.: 534,457

[22] Filed: Sep. 27, 1995

[51] Int. Cl.[6] .............................. B29C 47/00; C08L 89/00
[52] U.S. Cl. ................. 264/202; 106/124.2; 264/211.11
[58] Field of Search ..................... 264/202, 211.11, 264/177.11; 106/150.1, 139.3, 147.5, 147.1, 124.2

[56] References Cited

U.S. PATENT DOCUMENTS

| | | | |
|---|---|---|---|
| 1,027,122 | 5/1912 | Goldsmith | 106/147.6 |
| 2,297,959 | 10/1942 | Heckel | 106/147.1 |
| 2,399,084 | 4/1946 | Watson | 264/202 |
| 2,512,674 | 6/1950 | Peterson | 264/202 |
| 3,615,715 | 10/1971 | Mullen | 264/202 |
| 4,002,485 | 1/1977 | Hammer et al. | |
| 4,666,750 | 5/1987 | Hammer et al. | |
| 4,930,545 | 6/1990 | Hammer et al. | |
| 4,957,675 | 9/1990 | Oelsner | 264/202 |
| 5,358,784 | 10/1994 | Hammer et al. | |

FOREIGN PATENT DOCUMENTS

| | | |
|---|---|---|
| 0247437 | 12/1987 | European Pat. Off. |
| 0400484 | 12/1990 | European Pat. Off. |
| 0502431 | 9/1992 | European Pat. Off. |
| 3643199 | 6/1988 | Germany. |
| 92060B51 | 5/1978 | Japan. |
| 92045786 | 4/1990 | Japan. |

OTHER PUBLICATIONS

"Ullmanns Encyklopadie der technischen Chemie," Band 11 (Verlage Chemie, 1976) (in German) pp. 195, 199, 354 and 675–677.

*Primary Examiner*—Mathieu D. Vargot
*Attorney, Agent, or Firm*—Rothwell, Figg, Ernst & Kurz

[57] ABSTRACT

A method of producing a casein film, in the form of a planar film or a film tube, by mixing an aqueous solution containing at least one partly volatile carboxylic acid, at least one plasticizer and deionized water, with casein, and causing the mixture to swell, deforming the swollen mixture at temperatures of from 60° C. to 100° C. to obtain a film or a film tube; solidifying the film or film tube by treatment with an aqueous hardening solution and, optionally, by cold-smoking, and drying the film or film tube. The films have excellent packaging characteristics and are biodegradable. They are especially suited for use as edible sausage casings, packaging material for non-hygroscopic, powdery or fat-containing products, for packaging tablets and aromatic dry products, in the production of seed strips and adhesive tapes, and for lining paper.

24 Claims, No Drawings

METHOD OF PRODUCING CASEIN FILM

BACKGROUND OF THE INVENTION

1. Technical Field

The present invention relates to a method of producing a casein film for use, for example, as packaging material.

2. Description of the Background Art

Films are used in many industrial fields, for instance, for sealing purposes, as electric insulation, as carrier materials for functional layers and, in particular, as packaging material. As packaging material, films are used for packaging foodstuffs and luxury food as well as non-food articles. Sacks, bags, tubes and sachets are typically made from flat or tubular films, and cans, cups and dishes are produced from thicker films in a deep-drawing process. Films are also used in various applications as shrinkage films, skin packages or as bands or rip bands (Ullmann Enzyklopädie der technischen Chemie, Vol. 11, Verlag Chemie, Weinheim/Bergstraße, 1976, 2nd edition).

Films can be produced from a wide variety of raw materials, such as cellulose hydrate (cellophane), cellulose esters of organic monocarboxylic acids, low-density polyethylene, polypropylene, polyisobutylene, polystyrene, polyvinyl chloride (rigid PVC films and flexible PVC films), polyvinylidene chloride, polyvinyl fluoride, polytetrahalogenethylene, polymethylmethacrylate, polyamide, polyester, polycarbonate, polysulfone and polyimide. These films have varying characteristics, so that they can be used for packaging a wide variety of different articles under different conditions. For instance, untreated cellophane is glass-clear, glossy, has a high water vapor permeability, is unstable with water, but resistant to fat and oil, not sealable, adherent, odorless and tasteless. Cellophane can be used for packaging foodstuffs, and it is preferably used when protection against dust and contact is required. On the other hand, flexible PVC films are, among other things, resistant to initial tearing and further tearing, embossable, resistant to most inorganic and organic chemicals, highly resistant to ageing, largely resistant to water, light and weather, and they have a low gas and water vapor permeability. Flexible PVC films are therefore especially suited for use as packaging films, constructional films, cover films and for improving wooden surfaces.

Production methods for such films can fundamentally be subdivided into two method groups: (1) production by casting and spinning methods on the one hand and (2) production by thermoplastic methods on the other hand. In a casting and spinning method, raw materials are dissolved in a suitable solvent and passed through a slot-like die to form a film. In a thermoplastic deformation process the starting material in its plastic state is molded into a film under heat and by applying force. This can be done by rolling, injecting, blowing, melting and stretching. A thermoplastic deformation is advantageous, as it is suited for the production of films of any desired thickness, and especially for very thin films. A thermoplastic deformation is possible when the raw materials that are employed have a sufficiently wide plastic range between room temperature and decomposition temperature, or when they can be processed from the melt. Details concerning the production of films by thermoplastic deformation are described in Ullmann, Enzyklopädie der technischen Chemie, Vol. 11, pages 675–677, Verlag Chemie Weinheim/Bergstraße, 1976, 4th edition.

A reduction of the amount of film waste is highly desirable in view of environmental issues. The weight proportion of films in household refuse is about 1% to 2%. Especially in recent times, attempts have been made to replace films of synthetic and/or environmentally harmful raw materials by biodegradable films, preferably based on a natural product. A packaging material for foodstuffs and luxury food of decayable porous material is, for instance, known from DE-A-3643199. At least part of the inner wall of the packaging has provided thereon, for sealing purposes, at least two different fat-based impregnations of which at least one is a primer and at least another one a continuous cover glaze, at least one cover glaze being free of saccharose. In a special embodiment the cover glaze contains a finely divided solid material which may consist, at least partly, of casein.

It is an object of the present invention to provide a method for producing a film material which contains, as the main component, a natural and ecologically harmless material that is biodegradable and suited for use as a packaging material in a very wide variety of applications.

SUMMARY OF THE INVENTION

The foregoing and other objects are achieved according to the invention by a method for producing a casein film. The method comprises the steps of:

a) providing a swollen aqueous mixture of a partly volatile carboxylic acid, a plasticizer and casein;

b) forming the swollen mixture to obtain a film;

c) solidifying the film by treatment with an aqueous hardening solution; and d) dehydrating the film.

A preferred method according to the invention comprises the following steps:

a) preparing an aqueous mixture containing a partly volatile carboxylic acid, a plasticizer, deionized water and casein, and causing the mixture to swell;

b) forming the swollen mixture obtained in step (a) at temperatures of from 60° C. to 100° C. to obtain a film of a desired shape;

c) solidifying the film by treatment with an aqueous hardening solution and, optionally, by cold-smoking; and d) drying the film to a desired final moisture content.

The film may be prepared (formed) into any desired shape, for example, extruded as a planar film sheet or in the form of a tube.

DETAILED DESCRIPTION OF THE PREFERRED EMBODIMENTS

Casein is a prevalent protein component in milk and can easily be obtained by skimming milk to a fat content of from 0.05 to 0.2%, mixing the milk preheated to 45° C. with acids (sulfuric acid, lactic acid, hydrochloric acid) and setting it to a pH value of 4.6 (the isoelectric point of the casein), whereupon casein (acid casein) coagulates thereby becoming separable. Rennet casein is precipitated with the aid of rennet ferments at about 35° C. to 37° C., often by adding calcium chloride. After separation of the solid components from the liquid components (whey), casein is subjected to various washing and drying processes by pressing and is finally dried at 50° C. to 80° C. until the water content becomes less than 10%. For example, it is possible to isolate about 1 kg of casein from 30 liters of skimmed milk by employing this method. Details about the production or isolation of casein can be found in Ind. Ing. Chem. 44, 1257–1268 (1952). Hence, casein is generally available as a starting material for the method of the invention.

Both acid casein and rennet casein are suited for use in the present invention.

Casein powder having a grain size of 0.1 to 1 mm, preferably 0.2 to 0.5 mm, is preferably used as the starting material. In an especially preferred embodiment of the present invention, it has a water content of from 10 to 12%.

An aqueous mixture which contains at least one partly volatile carboxylic acid, at least one plasticizer, deionized water and casein in step (a) of the method of the invention contains, as the carboxylic acid, preferably acetic acid, formic acid and/or propionic acid, with acetic acid being especially preferred. A polyhydric alcohol, preferably glycerol, is for example employed as the plasticizer. In a preferred embodiment of the method of the invention, the aqueous mixture contains 21 to 100 g carboxylic acid(s), 100 to 300 g plasticizer and 400 to 500 g deionized water, per 1000 g casein. Temperatures of from 0° C. to 20° C. for the aqueous solution are especially preferred.

Preferably, an aqueous solution containing carboxylic acid and plasticizer is prepared in deionized water, following which the casein is admixed therewith. It is advantageous to keep the casein in a continuously moving state. This can be accomplished, for example, by stirring casein powder in a blending drum, or by placing casein on a moving conveyor belt while the aqueous solution is being sprayed thereon. The resultant mixture of casein and aqueous solution is caused to swell in step (a) of the method of the invention for 30 to 90 minutes, preferably for about 60 minutes. The swollen mixture is then deformed at temperatures of 60° C. to 100° C., preferably 80° C. to 90° C. to obtain a film or film tube. The swollen mixture is preferably extruded through a gap of any desired thickness, depending on the intended use of the resultant film. For instance, wall thicknesses can be set on an extruder for planar films of from 0.1 to 1 mm and for film tubes of from 0.1 to 0.3 mm.

The film or film tube obtained in step (b) of the method of the invention is solidified in step (c) of the method of the invention by treatment with an aqueous hardening solution and, optionally, by cold-smoking. The following two aqueous hardening solutions are preferred: (1) An aqueous solution containing deionized water, ammonium hydroxide, calcium acetate and at least one tanning agent; and (2) an aqueous solution containing deionized water, ammonium hydroxide and calcium acetate. Since the latter does not contain a tanning agent, the film or film tube must subsequently be cold-smoked when the film or film tube is solidified.

An aqueous solution containing 3 to 6% by weight of 30% ammonium hydroxide, 2 to 6 by weight of calcium acetate and 2 to 5% by weight of tanning agent is especially suited as the aqueous hardening solution containing the tanning agent. Tanning agents that are preferred according to the invention are glutardialdehyde, alum, preferably aluminum potassium bisulfate and, vegetable tanning agents, such as tannins. Tanning agents can be used individually or as a mixture thereof.

Both the aqueous hardening solution containing a tanning agent and the aqueous harding solution without tanning agent may additionally contain glycerol and/or calcium hydroxide. Glycerol is preferably added in an amount of from 5 to 15% by weight of the aqueous hardening solution and calcium hydroxide in an amount of from 0.05 to 0.1% by weight, in particular 0.1% by weight. Each of the aqueous hardening solutions is preferably used at a temperature of not more than 30° C., in particular of from 0° C. to about 5° C.

To prevent deformation or undulation possibly caused by stresses building up during the drying process when the film is dried in step (d) of the inventive method, the film is preferably placed on a stainless steel strip during drying. Furthermore, the film is somewhat post-stretched by being placed on the stainless steel strip, resulting in an even better solidification of the film.

Drying of the film in step (d) should preferably be carried out to a point where the water content of the film or film tube reaches 20 to 25%.

Preferably, a planar film is produced with a wall thickness of 0.1 to 1 mm, and a film tube is produced with a wall thickness of 0.1 to 0.3 mm in the inventive method.

The films or film tubes of casein which can be obtained in the method of the invention are especially advantageous because of their great strength and biodegradability. Furthermore, the films or film tubes have a good transparency and can be sealed at one side, laminated or deformed. Finally, it has been discovered that, when the films or film tubes are used for packaging foodstuffs, aromatic substances of foodstuffs can be preserved with excellent results.

Films or film tubes according to the present invention can be used as edible sausage casings, as packaging material for non-hygroscopic powdery products, such as coffee, tea and spices, for fat-containing products, such as lard, tallow and fatty oils, for packaging tablets and aromatic dry powders, as seed strips and adhesive tapes and for lining paper.

The following examples will explain the present invention:

EXAMPLES OF PRODUCTION AND USE

1. Packaging film for ground coffee.

A 5° C. cold solution consisting of 28 g acetic acid (98%), 180 g glycerol and 450 g deionized water was sprayed onto 100 g of granular casein powder (grain size up to 0.5 mm) under constant movement of the casein grains in a blending drum and caused to swell under movement for at least 90 minutes. The resulting mixture was then plasticized in an extruder at 75° C. to 80° C. and discharged through a gap of 1.1×400 mm before the extruded material was extended or prestretched at 30° C. to 35° C. for smoothing purposes by $\frac{1}{15}$ of its length. The film strip smoothed by the stretching action was then placed on a continuously running, endless stainless-steel strip, and the film was hardened or solidified at a temperature of 1° C. with a solution of 100 g glycerol, 50 g calcium acetate, 9 g calcium hydroxide, 40 g tannin, 50 g ammonium hydroxide (30%) and deionized water (ad 1000 g). Finally, the film was dried on the stainless steel strip with an air current of 30° C. to 35° C. and at a relative humidity of air of 60 to 70% to a water content of 25%, the film was removed from the stainless steel strip and stretched once again by $\frac{1}{50}$ of its length.

The resultant film was formed into an open bag, the untreated side was sealed, and ground coffee was filled into the bag, whereupon the opening was also sealed.

2. Packaging film for tablets, dragees and capsules.

A 8° C. cold solution consisting of 30 g acetic acid (98%), 120 g glycerol and 500 g deionized water was sprayed onto 1000 g of granular casein powder (grain size up to 0.2 mm) under constant movement of the casein grains in a blending drum and caused to swell under movement for at least 60 min. The resulting mixture was plasticized in an extruder at 70° C. to 75° C. and discharged through a gap of 0.7×400 mm. For smoothing purposes the film strip was stretched (prestretched) at 30° C. to 35° C. by $\frac{1}{20}$ of its length and the smoothed film strip was then placed on a continuously running, endless stainless-steel strip. To harden (solidify) the film, a 3° C. cold solution of 100 g glycerol, 40 g calcium acetate, 9 g calcium hydroxide, 30 g tannin, 40 g ammonium hydroxide (30%) and deionized water (ad 1000 g) was sprayed over the entire surface of the film. After the spraying action had been completed, the film was dried on the stainless steel strip with an air current of 30° C. and at a relative humidity of air of 60 to 70% to a water content of 20%. The film was then removed from the stainless steel strip and post-stretched by 1/100 of its length.

The resultant film was drawn into containers corresponding to the shape and size of the tablets, dragees or capsules to be packaged, filled with the tablets, dragees or capsules, and sealed to a cover film, of, for example, paper, with the pre-tanned film side being oriented to the outside.

3. Production of seed films.

A film was produced in the manner described in Example 2, except that instead of tablets, dragees or capsules, seeds were filled into the containers and sealed by a planar cover film of paper.

4. Production of washable wallpapers.

A 5° C. cold solution consisting of 25 g acetic acid (28%), 300 g glycerol and 450 deionized water was sprayed onto 1000 g of granular casein powder (grain size: 0.3 mm) under constant movement of the casein grains in a blending drum and caused to swell under movement for 80 min. The swollen mixture was then plasticized in an extruder at 80° C. to 85° C. and discharged through a gap of 0.8×400 mm. For smoothing purposes the film strip was pre-stretched at 30° C. to 35° C. by 1/20 of its length and subsequently placed on a continuously running, endless stainless-steel strip. The film was then solidified with a hardening solution, at 2° C., consisting of 150 g glycerol, 30 g calcium acetate, 8 g calcium hydroxide, 20 g aluminum potassium bisulfate, 30 g ammonium hydroxide (30%) and deionized water (ad 1000 g). After the spraying action the film was dried on the stainless steel strip with an air current of 30° C. and at a relative humidity of air of 60% to 70% to a water content of 25%, the film was removed from the stainless steel strip and post-stretched by 1/80 of its length.

Wallpapers were laminated with the resultant film. The wallpapers can be cleaned with water or aqueous solutions of a stain removing salt, so as to provide a product having excellent properties for use in bathrooms or kitchens.

5. Production of glossy labels.

A film was produced in the manner described in Example 4 and laminated onto paper labels. Being reused the labels could be removed from the containers to which they were stuck, just like normal paper labels.

6. Production of a film tube for casings.

A solution (15° C.) consisting of 35 g acetic acid (28%), 220 g glycerol and 450 g deionized water was sprayed onto 1000 g of granular casein powder (grain size up to 0.1 mm) under constant movement of the casein grains in a blending drum and caused to swell under movement for at least 40 min. The swollen mixture was plasticized in an extruder at 85° C. to 90° C. and vertically discharged through a ring die (gap diameter: 0.3 mm, ring die diameter: 50 mm). The extruded film tube was treated with a solution cooled to 0° C. and consisting of 130 g glycerol, 50 g calcium acetate, 9 g calcium hydroxide, 400 g deionized water, 50 g ammonium hydroxide (30%) and common (table) salt (up to saturation). The film tube was then cured in a cold-operated smoke chamber (30° C. to 35° C.) for 10 min and subsequently stretched by 1/100 of its length to increase its strength.

For making sausages the resultant film tube was wetted with water and pulled onto the device of an automatic sausage filling apparatus as conventionally used in the making of sausages. Sausage was filled into the casing, and sausages were made in the conventional manner.

I claim:

1. A method of producing a casein film, comprising:

a) providing a swollen aqueous mixture of a partly volatile carboxylic acid, a plasticizer and casein;

b) forming the swollen mixture to obtain a film;

c) solidifying the film by treatment with an aqueous hardening solution; and d) dehydrating the film.

2. A method according to claim 1, wherein the aqueous mixture is prepared by spraying an aqueous solution of carboxylic acid and plasticizer in deionized water onto casein solids.

3. The method according to claim 1, wherein the mixture in step (a) is permitted to swell for 30 minutes to 90 minutes.

4. The method according to claim 1, wherein the carboxylic acid is a member selected from the group consisting of acetic acid, formic acid and propionic acid.

5. The method according to claim 2, wherein the carboxylic acid comprises acetic acid.

6. The method according to claim 1, wherein the solidifying step (c) comprises treating the film with an aqueous hardening solution containing deionized water, ammonium hydroxide, calcium acetate and a tanning agent.

7. The method according to claim 1, wherein the solidifying step (c) comprises treating the film with an aqueous hardening solution containing deionized water, ammonium hydroxide and calcium acetate, followed by cold-smoking the film.

8. The method according to claim 6, wherein the aqueous hardening solution comprises 3 to 6% by weight of 30% ammonium hydroxide, 2 to 6% by weight of calcium acetate and 2 to 5% by weight of tanning agent.

9. The method according to claim 6, wherein the tanning agent comprises glutardialdehyde, an alum, or a vegetable tanning agent.

10. The method according to claim 9, wherein the vegetable tanning agent is a tannin.

11. The method according to claim 6, wherein the aqueous hardening solution further comprises glycerol and calcium hydroxide.

12. The method according to claim 11, wherein the aqueous hardening solution comprises 5 to 15% by weight of glycerol and 0.05 to 0.1% by weight of calcium hydroxide.

13. The method according to claim 1, wherein the film is treated with an aqueous hardening solution at a temperature of not more than 30° C.

14. The method according to claim 1, wherein the plasticizer comprises a polyhydric alcohol.

15. The method according to claim 1, wherein the plasticizer comprises glycerol.

16. The method according to claim 1, wherein the aqueous mixture comprises 21 g to 100 g of carboxylic acid, 100 g to 300 g plasticizer and 400 g to 500 g deionized water, per 1000 g of casein.

17. The method according to claim 1, wherein the film is dried in step (d) to a water content of 20 to 25%.

18. The method according to claim 1, wherein drying step (d) further comprises placing the film on a stainless steel strip.

19. The method according to claim 1, wherein the film is formed as a planar film with a thickness of from 0.1 to 1 mm.

20. The method according to claim 1, wherein the film is formed as a film tube with a wall thickness of from 0.1 to 0.3 mm.

21. A method of preparing a casein film, comprising:

providing an aqueous solution of a partly volatile carboxylic acid and a plasticizer in deionized water;

contacting particulate casein solids with the aqueous solution to swell the casein;

forming the swelled casein into a film;

hardening the film by contacting the film with a hardening solution; and dehydrating the hardened film to a preselected final moisture content.

22. The method according to claim 21, wherein the aqueous solution has a temperature of from 0° C. to 20° C.

23. The method according to claim 21, wherein the particulate casein solids comprise a casein powder having a grain size of 0.1 to 1 mm.

24. The method according to claim 23, wherein the casein powder has a water content of from 10 to 12%.

* * * * *